United States Patent [19]
Jacob et al.

[11] Patent Number: 5,665,001
[45] Date of Patent: Sep. 9, 1997

[54] COUPLING FOR CONNECTING TWO SHAFTS

[75] Inventors: Werner Jacob, Frankfurt; Manfred Niederhüfner, Hanau; Olaf Orlamünder, Offenbach, all of Germany

[73] Assignee: Lohr & Bromkamp GmbH, Offenbach am Main, Germany

[21] Appl. No.: 456,157

[22] Filed: May 31, 1995

[30] Foreign Application Priority Data

Jun. 3, 1994 [DE] Germany .................. 44 19 342.4

[51] Int. Cl.$^6$ ........................................ F16D 1/02
[52] U.S. Cl. ................................. 464/182; 403/359
[58] Field of Search ......................... 464/179, 182, 464/149, 153, 154; 403/359, 22

[56] References Cited

U.S. PATENT DOCUMENTS

| | | | |
|---|---|---|---|
| 1,507,991 | 9/1924 | Edwards | 403/359 X |
| 2,680,634 | 6/1954 | Haworth et al. | 464/154 X |
| 3,132,494 | 5/1964 | Hoffer | 464/154 |
| 3,744,577 | 7/1973 | Williams | 464/182 X |
| 4,556,398 | 12/1985 | Baldenko et al. | 464/154 X |
| 4,650,441 | 3/1987 | Lepson | 464/154 X |
| 5,141,350 | 8/1992 | Hecke | 464/182 X |
| 5,433,551 | 7/1995 | Gordon | 403/22 X |

FOREIGN PATENT DOCUMENTS

| | | | |
|---|---|---|---|
| 440816 | 2/1927 | Germany . | |
| 2180625 | 4/1987 | United Kingdom | 464/154 |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A coupling (14) axially and non-rotatingly connects two shafts (8, 12). Both shafts, at their ends facing one another, includes shoulders (18, 19) provided with teeth (24). A first tensioning sleeve (29) which, in its bore (28), has a set of teeth (26) matching the teeth (24), is slid onto the two sets of teeth (24) of the shoulders (18, 19), to achieve a non-rotating connection between the two shafts (8, 12). A second tensioning sleeve (30) is threaded onto the outer thread (29) of the first tensioning sleeve (25). The two tensioning sleeves (25, 30) have radially inwardly directed collars (27, 31), which axially contact a contact face (22, 23) of the two shoulders (18, 19). When threaded together, the sleeves cause the two shafts (8, 12) to be axially tensioned so that their end faces (20, 21) are axially tensioned relative to one another. In this way, it is possible to achieve a simple coupling to non-rotatingly connect two shafts, which, even under restricted space conditions, enables re-assembly to replace components.

10 Claims, 2 Drawing Sheets

COUPLING FOR CONNECTING TWO SHAFTS

BACKGROUND OF THE INVENTION

The invention relates to a coupling for non-rotatingly connecting two shafts including a joint rotational axis. A torque transmitting mechanism is associated with the two shafts. The shafts have tensioning means at their end faces to axially tension the shafts relative to one another. The tensioning means includes two tensioning sleeves which, via threads, are axially threadedly connected to one another. A tensioning sleeve is associated with each shaft and is axially supported thereon.

A coupling is described in DE 440 816, issued Feb. 16, 1927, wherein the two shafts have toothed end faces. The end faces of the two shafts are axially tensioned relative to one another by tensioning sleeves. Arranging the teeth at the end faces is expensive. Furthermore, during the transmission of torque, the teeth generate axial force which have to be accommodated by the tensioning sleeves. The teeth at the end faces have to be produced with great accuracy to prevent any errors of alignment of the two shafts to be connected to one another. The accuracy of alignment of the two shafts relative to one another depends on the teeth at the end faces. Furthermore, for assembly purposes, it is necessary to provide a certain axial movement which is not always available when the shaft is in the fitted condition.

SUMMARY OF THE INVENTION

It is an object of the invention to propose a coupling to connect two shafts which is of simple design and easy to produce, which enables the shafts to be centered easily.

In accordance with the invention, the shafts, towards their end faces which support one another, include a shoulder. The shoulder projects from the shaft's outer circumference and has a predetermined axial length. The shoulders, at their outer faces, include torque transmitting means. The first tensioning sleeve has a bore with torque transmitting means which are engagable with the torque transmitting means of the shoulders in a form-fitting manner. The bore further includes a face provided with a thread. The second tensioning sleeve has a thread which mates the thread of the first tensioning means.

An advantage of this embodiment is that the teeth on the outer face of the shaft in the region of its collars are easy to produce. The teeth may be produced by broaching, hammering, rolling or the like. The profile in the sleeve is also easy to produce. The two shafts are centered by the tensioning sleeve slid over the shoulders. Furthermore, for assembly purposes, only short axial distances are required.

The torque transmitting means are preferably teeth which extend parallel to the longitudinal axis. Involute teeth are particularly suitable. Involute teeth are advantageous since they require only short tooth lengths to transmit the necessary torque. This is the reason why, in the radial direction, too, the coupling is small.

Centering is advantageously affected by providing teeth with a slightly firm fit when inserted into one another. However, the slightly firm fit still enables easy assembly and dismantling operations. Alternatively, it is also possible to provide the torque transmitting means on the shoulders in the form of a polyhedron, with the tensioning sleeve including a corresponding bore.

As far as the first tensioning sleeve is concerned, two embodiments are disclosed. According to a first embodiment, the first tensioning sleeve is axially secured to the associated shaft by a securing ring. An advantage of this arrangement is that the securing ring may be arranged in the bore of the tensioning sleeve. The tensioning sleeve is particularly easy to produce because the teeth in the bore of the tensioning sleeve may be produced by broaching, for example. Also, the tensioning sleeve may be formed of a cold-extruded profiled tube including the teeth. The individual tensioning sleeves may be obtained by cutting the tube to length. The groove to receive the securing ring subsequently is produced in the bore by a chip-removing machining operation. Also, the thread is formed on the outer face of the tensioning sleeve. The teeth prevent the sleeve from rotating so that there also exists the necessary counter force when threading on the second tensioning sleeve.

Alternatively it is possible for at least one of the tensioning sleeves to be axially supported on the associated shaft by a collar. With such an embodiment, the first tensioning sleeve with teeth in the bore, is preferably produced by a non-chip producing forming operation. For supporting purposes, both shoulders are provided with an annular face to enable the respective collar to rest thereagainst.

A particularly advantageous solution is obtained if the coupling forms part of a driveshaft with two constant velocity joints connected to one another by a shaft. The shaft may be divided, so that two shaft portions exist which may be connected to one another by a coupling. Thus, it is possible to separate the shaft in the region of the coupling to carry out repair work even after the driveshaft has been fitted into a motor vehicle. With such driveshafts fitted into vehicles there is very little space available.

For example, when a convoluted boot is destroyed, the entire driveshaft has to be removed to replace the boot. Also the joint at the gearbox end has to be removed from the differential. Further, it may be necessary to separate the wheel bearing unit from the wheel carrier to be able to remove the joint at the wheel end. Subsequently, it is necessary to carry out a dismantling operation to separate at least one end of the shaft from one of the constant velocity joints so that a new convoluted boot can be slid on. The separating facility provided by the coupling in accordance with the invention simplifies the dismantling and re-assembly operations which are carried out for the purpose of replacing components.

Normally shafts with constant velocity joints also provide a plunging facility. Thus, it is possible in those cases where the first tensioning sleeve is axially secured to the shoulder, to use the plunging distance, which may be covered by a constant velocity joint or for which a separate sliding part is provided, as the required short assembly distance.

In the case of an embodiment where the first tensioning sleeve is supported by a collar at the associated shaft, there is practically no need for an axial assembly and dismantling path to cause the tensioning sleeve to engage the teeth of the two shoulders. The first tensioning sleeve may simply be pulled off. In this way, it is possible for the two shafts to be radially aligned relative to one another.

From the following detailed description taken in conjunction with the accompanying drawings and subjoined claims, other objects and advantages of the present invention will become apparent to those skilled in the art.

DETAILED DESCRIPTION OF THE DRAWINGS

Figure 1:
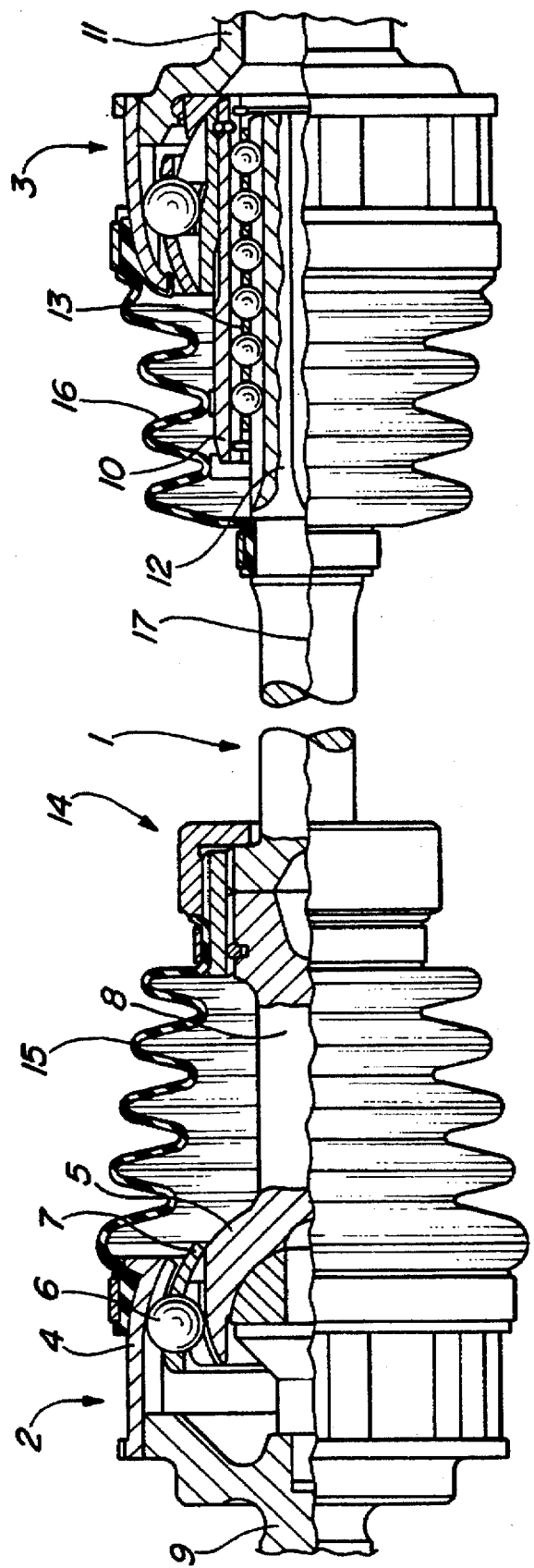
FIG. 1 is a partial cross-section view of a driveshaft with two constant velocity joints and a coupling in accordance with the invention for connecting two shaft portions.

FIG. 1 shows a driveshaft 1. The driveshaft 1 has a first constant velocity joint 2 with an outer joint part 4. An inner joint part 5 is arranged in the cavity of the outer joint part 4. Balls 6 are received in circumferentially distributed tracks in the inner face of the outer joint part 4 and in the outer face of the inner joint part 5. The balls 6 are held in a cage 7. The outer joint part 4 and the inner joint part 5 are able to carry out angular movements relative to one another. Thus, torque may be transmitted from the outer joint part 4 to the inner joint part 5 and vice versa. To connect the outer joint part 4 to a driving or driven part, for example a wheel flange of a motor vehicle associated with one of the driven vehicle wheels or a connecting journal, is provided which is inserted into the wheel hub. The inner joint part 5 is connected to a shaft journal 8.

In principle, the second constant velocity joint 3 is designed like the first constant velocity joint 2. For connecting purposes, a journal 11 is provided which serves to provide a connection with the output bevel gear of an axle differential of a motor vehicle, for example. To enable changes in the distance between the two constant velocity joints 2, 3 a sliding part 13 is integrated into the connection between the two inner parts 5 of the two constant velocity joints 2, 3. The sliding part 13 is formed by a sliding sleeve 10 connected to the inner joint part of the second constant velocity joint 3 and by a cooperating shaft 12. Torque transmitting balls are arranged in grooves between the shaft 12 and the sliding sleeve 10. The balls enable a displacement of the shaft 12 and the sliding sleeve 10 relative to the longitudinal axis 17 which constitute the rotational axis of the shaft 12.

The shaft journal 8 and the shaft 12 constitute shafts which are connected to one another by a coupling 14. Convoluted boots 15, 16 seal the constant velocity joints 2, 3 of the connecting shaft. The connecting shaft forms the connection between the inner joint part 5 of the two constant velocity joints 2, 3 and includes the two shafts 8, 12. The convoluted boots 15, 16 enclose the lubricant required to lubricate the constant velocity joints 2, 3 and the sliding part 13. To facilitate dismantling of the driveshaft 1, for example to carry out repair work in a vehicle, separation is effected in the region of the coupling 14.

Figure 2:
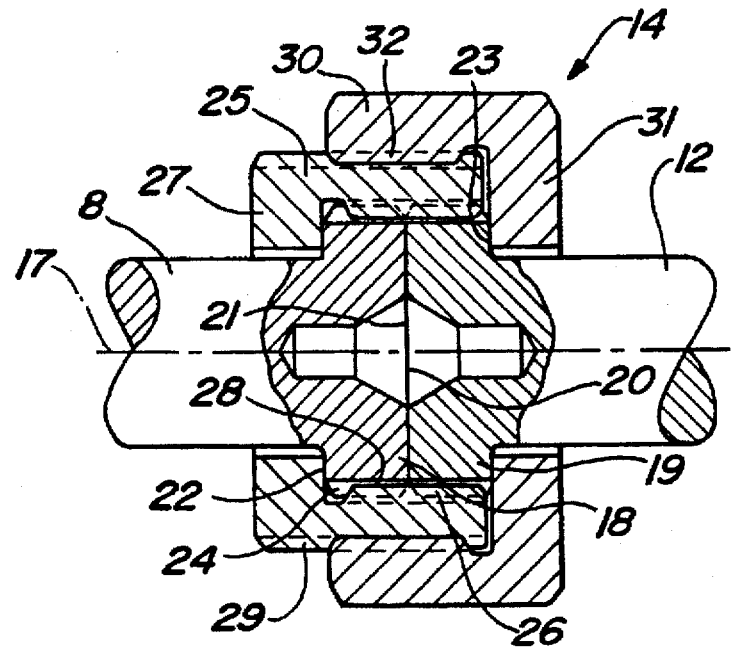
FIG. 2 is an enlarged longitudinal section view through a first embodiment of a coupling.

In the case of the embodiment of the coupling 14 illustrated in FIG. 2, the shaft journal according to FIG. 1, which constitute the first shaft 8 includes a shoulder 18 towards its end face 20. The shoulder 18 is provided with teeth 24 which extend parallel to the rotational axis 17. Furthermore, the shoulder 18 forms a contact face 22 in the form of an annular face.

The second shaft 12 towards its end face 21, also includes a shoulder 19. The shoulder outer face includes teeth 26 corresponding to the teeth 24 of the first shoulder 18 of the shaft 8. The shoulder 19 forms a further contact face 23 provided in the form of an annular face.

A first tensioning sleeve 25 comprises a bore 28 with teeth 26. The teeth 26 mate the teeth 24 in a light interference fit, of the two shoulders 18, 19 and is in the form of involute teeth, for instance. At one end, the first tensioning sleeve 25 has a radially inwardly directed collar 27 resting against the contact face 22. On its outer face, the first tensioning sleeve 25 includes a thread 29. The first tensioning sleeve 25, via its teeth 26, is slid over the two sets of teeth 24 of the two shoulders 18, 19, thereby establishing a non-rotating connection between the two shafts 8, 12. A second tensioning sleeve 30 includes a radially inwardly extending collar 31 which is supported against the contact face 23 of the shoulder 19 in the tensioned condition. The bore of the second tensioning sleeve 30 includes a thread 32 matching the thread 29 of the first tensioning sleeve 25.

The second tensioning sleeve, via its thread 32, is screwed on to the thread 29 of the first tensioning sleeve. Thus, the collar 27 of the first tensioning sleeve 25 axially rests against the contact face 22 of the shoulder 18. The second tensioning sleeve 30, via its collar 31, axially rests against the contact face 23 of the shoulder 19. When threading on the tensioning sleeve 30 further, the end faces 20, 21 of the two shafts 8, 12 are axially pressed against one another. The second tensioning sleeve 30 may be provided with key faces, for example, to be able to apply, via a wrench, the necessary torque for threading with the first tensioning sleeve 25. However, in the case of this embodiment, it is necessary for the shaft 8 to constitute a separate component which, for instance by plug-in teeth, is connected to the inner joint part of a constant velocity joint, so that the first tensioning sleeve 25 can be slid over the shaft 8.

Figure 3:
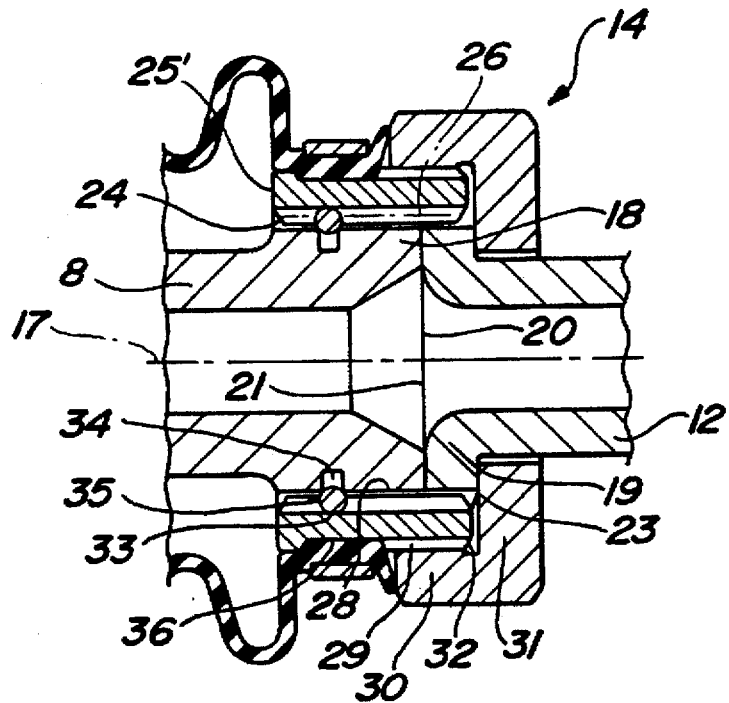
FIG. 3 is a longitudinal section view like FIG. 2 of an additional embodiment of a coupling.

In the embodiment of the coupling 14 as illustrated in FIG. 3, and which is also shown in FIG. 1, the same reference numerals identify the same elements as described in FIG. 2, the first tensioning sleeve 25' does not include a collar. The sleeve is a continuous sleeve with a through-bore 28 provided with teeth 26. Furthermore, the bore 28 of the first tensioning sleeve 25' is provided with a groove 35 which corresponds to a groove 34 in the shoulder 18 of the shaft 8. The depth of the groove 34 in the shoulder 18 is such that when sliding the first tensioning sleeve 25', via its teeth 26, onto the teeth 24 of the first shoulder 18, a securing ring 33 is able to engage the groove 34. Also, the first tensioning sleeve 25' is able to pass the outer face of the securing ring 33. When the two grooves 34, 35 assume corresponding positions, the securing ring 33 is able to expand radially and engage the groove 35 of the first tensioning sleeve 25'.

The outer face of the first tensioning sleeve 25' has a further receiving groove 36 to secure the convoluted boot. Furthermore, towards the shoulder 19 of the shaft 12, the first tensioning sleeve 25' includes a thread 29. The teeth 26 of the first tensioning sleeve 25' axially cover at least partially the teeth 24 of the shoulder 19 of the shaft 12. The second tensioning sleeve 30 includes a collar 31 and in its bore it has a thread 32 which matches the thread 29 of the first tensioning sleeve 25'. The collar 31 is threaded onto the first tensioning sleeve 25'. The second tensioning sleeve, via its collar 31, axially rests against the contact face 23 of the shaft 12. Thus, the sleeve tensions the two shafts 8, 12 relative to one another. The respective axial counter force is applied by the securing ring 33 which axially holds the first tensioning sleeve 25' relative to the shaft 8.

While the above detailed description describes the preferred embodiment of the present invention, the invention is susceptible to modification, variation and alteration without deviating from the scope and fair meaning of the subjoined claims.

We claim:

1. A coupling for connecting two shafts against rotation, said shafts defining a rotational axis, said coupling comprising:

first means for transmitting torque, said first torque transmitting means associated with the two shafts, said shafts having tensioning means at their end faces for axially tensioning the shafts relative to one another, said tensioning means includes first and second tensioning sleeves, said first and second tensioning sleeves including threads for axially coupling to one another, with one of said tensioning sleeves being associated with each shaft and being axially supported on said shafts;

said shafts towards end faces supporting one another including a shoulder which projects from an outer circumference and including a predetermined axial length, each of said shoulders including said first torque transmitting means, said first tensioning sleeve including a bore provided with second torque transmitting means which are engagable with said first torque transmitting means of each of the shoulders in a form-fitting manner.

2. A coupling according to claim 1, wherein said first and second torque transmitting means are teeth which extend parallel to the longitudinal axis.

3. A coupling according to claim 2, wherein said teeth are shaped like involute teeth.

4. A coupling according to claim 2, wherein said teeth feature a light interference fit when inserted into one another.

5. A coupling according to claim 1, wherein the first tensioning sleeve is axially secured to the associated shaft by a securing ring.

6. A coupling according to claim 1, wherein at least one of the tensioning sleeves includes a collar which is axially supported on the associated shaft.

7. A coupling according to claim 6, wherein said collar axially rests against an annular face of the shoulder.

8. A driveshaft including a rotation axis including a coupling providing a connection between two shafts, one shaft connected to a first constant velocity joint and the other shaft connected to a second constant velocity joint, said coupling comprising:

first means for transmitting torque, said first torque transmitting means associated with the two shafts, said shafts having tensioning means at their end faces for axially tensioning the shafts relative to one another, said tensioning means includes first and second tensioning sleeves, said first and second tensioning sleeves including threads for axially coupling to one another, with one of said tensioning sleeves being associated with each shaft and being axially supported on said shafts;

said shafts towards end faces supporting one another including a shoulder which projects from an outer circumference and including a predetermined axial length, each of said shoulders including said first torque transmitting means, said first tensioning sleeve including a bore provided with second torque transmitting means which are engagable with said first torque transmitting means of each of the shoulders in a form-fitting manner.

9. A coupling according to claim 8, wherein one of the constant velocity joints is provided in the form of a joint enabling plunging movements.

10. A coupling according to claim 8, wherein one of the shafts includes a sliding part enabling sliding movement of one of the constant velocity joints with respect to the shaft.

* * * * *